US010135281B2

United States Patent
Tkachenko et al.

(10) Patent No.: US 10,135,281 B2
(45) Date of Patent: Nov. 20, 2018

(54) CHARGING A BATTERY WITH FREQUENCY-MODULATED PULSES BASED ON BATTERY MEASUREMENTS

(71) Applicant: GBATTERIES ENERGY CANADA INC., Ottawa (CA)

(72) Inventors: Oleksandr Tkachenko, Ottawa (CA); Mykola Sherstyuk, Ottawa (CA)

(73) Assignee: GBatteries Energy Canada Inc., Ottawa (CA)

(*) Notice: Subject to any disclaimer, the term of this patent is extended or adjusted under 35 U.S.C. 154(b) by 0 days.

(21) Appl. No.: 15/644,498

(22) Filed: Jul. 7, 2017

(65) Prior Publication Data
US 2018/0013306 A1    Jan. 11, 2018

Related U.S. Application Data

(60) Provisional application No. 62/360,432, filed on Jul. 10, 2016.

(51) Int. Cl.
*H02J 7/00*      (2006.01)
(52) U.S. Cl.
CPC ............ *H02J 7/0093* (2013.01); *H02J 7/007* (2013.01)

(58) Field of Classification Search
CPC ................................ H02J 7/0093; H02J 7/007
USPC .......................................... 320/118, 139, 141
See application file for complete search history.

(56) References Cited

U.S. PATENT DOCUMENTS

| 5,296,797 A | 3/1994 | Bartlett | |
|---|---|---|---|
| 6,841,974 B2* | 1/2005 | Dykeman | H02J 7/0093 320/141 |
| 7,622,898 B2* | 11/2009 | Shimizu | H02J 7/0016 320/166 |

FOREIGN PATENT DOCUMENTS

| KR | 20040080907 A | 9/2004 |
|---|---|---|
| WO | 9852270 A | 11/1998 |

OTHER PUBLICATIONS

International Search Report dated Sep. 29, 2017 for PCT Appln. PCT/CA2017/050833; 4 pages.

* cited by examiner

*Primary Examiner* — Nathaniel Pelton
(74) *Attorney, Agent, or Firm* — Schott, P.C.

(57) ABSTRACT

Disclosed is pulse charging of a battery that uses frequency modulation to vary the pulse periods of the charging pulses. Battery measurements can be made to determine the duty cycles of the charging pulses.

15 Claims, 10 Drawing Sheets

CHARGING A BATTERY WITH FREQUENCY-MODULATED PULSES BASED ON BATTERY MEASUREMENTS

CROSS REFERENCE TO RELATED APPLICATION

Pursuant to 35 U.S.C. § 119(e), this application is entitled to and claims the benefit of the filing date of U.S. Provisional App. No. 62/360,432, filed on Jul. 10, 2016, the content of which is incorporated herein by reference in its entirety for all purposes.

BACKGROUND

A "battery" or battery pack may comprise several battery cells. A battery cell typically includes a casing to hold the components the of the battery cell. The battery cell may include an anode (negative electrode) immersed in a suitable electrolyte. The anode may comprise any suitable compound such as porous carbon particles; e.g. graphite particles arranged into sheets. The battery cell may further include a cathode immersed in an electrolyte. The cathode may comprise any suitable metal oxide compound such as cobalt-oxide ($CoO_2$) particles.

A battery discharges, for example, when it is connected across a load. During discharging, ions (e.g., lithium ions) flow through the electrolyte from the negative electrode to the positive electrode. Electrons flow from the negative electrode to the positive electrode through the load. The lithium ions and electrons combine at the positive electrode. When no more Li ions flow for the given discharge potential applied across the cell, the battery can be deemed to be fully discharged.

During charging, the lithium ions flow from the positive electrode to the negative electrode through the electrolyte. Electrons flow through the external charger in the direction from the positive electrode to the negative electrode. The electrons and lithium ions combine at the negative electrode and deposit there. When no more Li ions flow for the given charge potential applied across the cell, the battery can be deemed fully charged and ready to use.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

During a charging process of the battery cell, electric charge can build up in the battery cell. The battery cell comprises a number of mechanisms to dissipate (discharge) the accumulated charge energy. The dissipation mechanisms are substantially distributed inside the battery cell. It is believed the dissipation mechanisms transfer energy (electric charge) to drive electrochemical reactions in the material of the negative electrode, the surrounding electrolyte, and the lithium ions to redistribute the lithium ions in the negative electrode to the positive electrode. The stored energy can therefore be transformed into ionic storage form, such as the redistribution of lithium ions from the negative terminal to the positive terminal.

Charge dissipation can occur at different rates. The discharge rate can be defined and affected by local levels of accumulated charge in the battery, local properties of the dissipation mechanisms, and so on. Due to such differences, the dissipation time can vary from region to region with the battery cell. These dissipation mechanisms allow for the concurrent discharge of stored energy. Thus, the longest of the dissipation times should be sufficient time for the stored energy to dissipate into chemical form. It has been observed that dissipation times are normally in the range between 0.1 μs and 100 ms.

The present disclosure presents circuits and techniques for pulse charging of batteries. Pulse charging in accordance with the present disclosure takes into consideration the foregoing real-time electrochemical and macrokinetic processes that occur within a battery cell. This includes progression of the electrode material's elastic deformations and mechanical impedance changes during lithium ion intercalation and deintercalation. Models of battery cell chemistry can be used in real-time calculations, and electric current bursts (pulses) can be controlled in real-time at microsecond scales.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
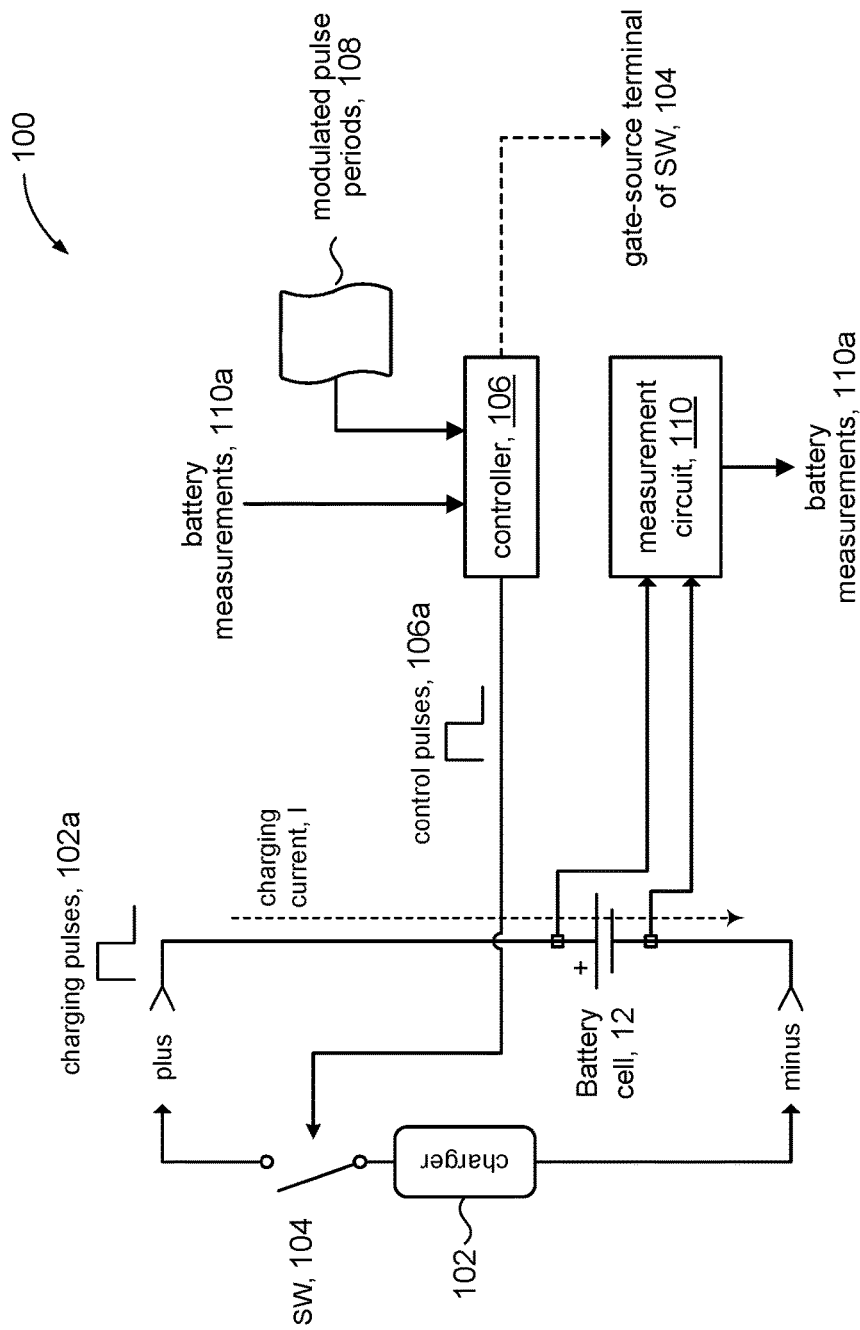
FIG. 1 shows a battery charging circuit in accordance with the present disclosure.

FIG. 1 shows a charging system 100 for charging a battery 12 in accordance with embodiments of the present disclosure. The battery 12 can be a lithium-ion battery, and can be a single cell design or a battery pack (not depicted) comprising several battery cells. The battery 12 may have negative (minus) electrode also referred to as the anode, and a positive (plus) electrode also referred to as a cathode.

The charging system 100 can include a charger (also referred to as a power source) 102 to provide power (e.g., current, voltage) to the battery 12 during charging. The charger 102 can be any suitable power source such as, but not limited to, a AC adapter, a capacitive device, another battery, and so on. The charging system 100 can include a switch 104 that can be controlled (ON, OFF) to provide a charging current I from the charger 102 to the battery 12 in bursts (charging pulses 102a) of energy. In some embodiments, for example, the switch 104 can be a field effect transistor (FET) device.

The charging system 100 can include a controller 106 configured to operate in accordance with the present disclosure. The controller 106 can generate control pulses 106a that are provided to the switch 104 to control operation of the switch 104 to produce the charging pulses 102a. In accordance with the present disclosure, the controller 106 can modulate the frequency (e.g., pulse period) of the control pulses 106a. For example, the controller 106 can control the duration of the ON period and the OFF period of each control pulse 106a.

In some embodiments, the controller 106 can use a lookup table 108 that defines a set of modulated pulse periods. In other embodiments, the controller 106 can modulate the pulse periods of the control pulses 106a by computing the pulse periods on the fly; e.g., using a mathematical function. The amplitudes of the control pulses 106a are logic levels, and can vary between logic LO (e.g., $V_{SS}$, such a ground potential) to logic HI (e.g. $V_{DD}$ such as 5V).

The charging system 100 can include a measurement circuit 110 to measure the flow of energy (e.g., electrical current) through the battery 12 during charging. In accordance with the present disclosure, battery measurements 110a produced by the measurement circuit 110 can be provided to the controller 106. The controller 106 can be configured to generate control pulses 106a that are further based on the battery measurements 110a.

Figure 2A:
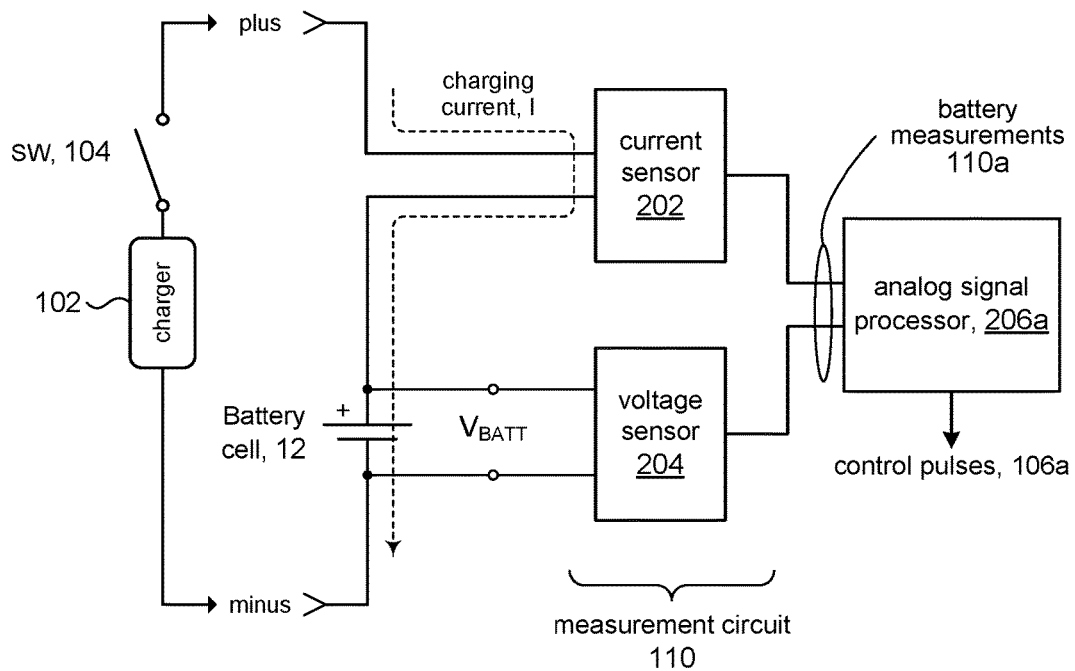
FIGS. 2A and 2B illustrate examples of measurement circuits.
Figure 2B:
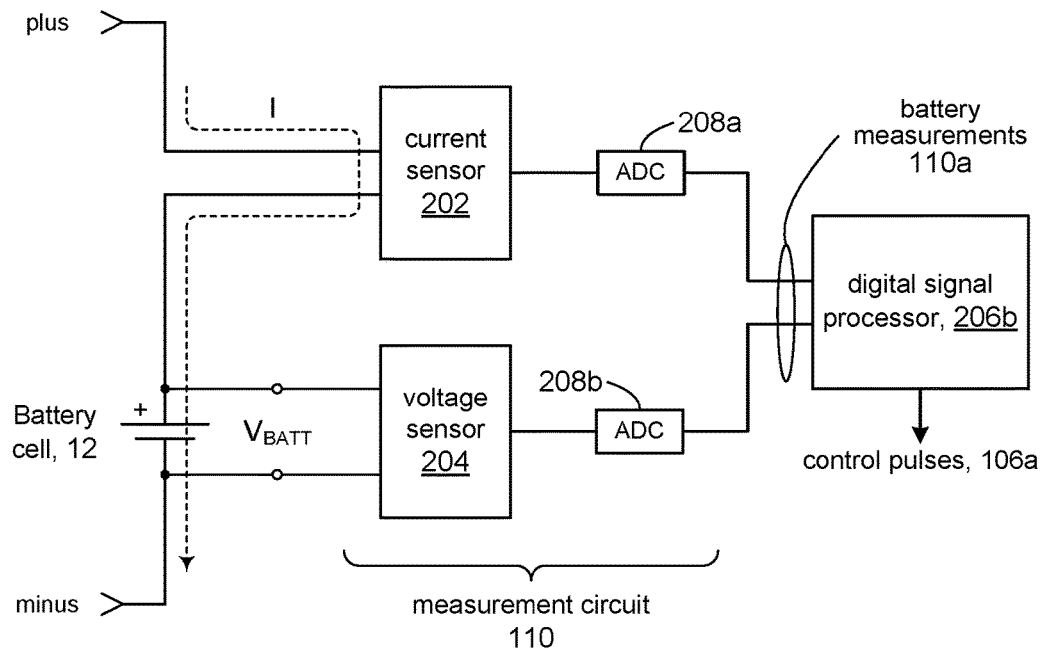

FIGS. 2A and 2B show illustrative examples of a measurement circuit 110 in relation to the controller 106. FIG. 2A, for example, shows that in some embodiments, the controller 106 can be an analog signal processor 206a. The measurement circuit 110 can include a current sensor 202 to measure the flow of charging current I through the battery 12. The current sensor 202 can provide a measure of the charging current I (e.g., in the form of an analog signal) to the analog signal processor 206a. The measurement circuit 110 can further include a voltage sensor 204 (e.g., difference amplifier) to provide the analog signal processor 206a with a measure of the battery voltage.

FIG. 2B depicts an embodiment that is digital. The controller 106 can be a digital signal processor (DSP) 206b or other similar digital signal processing unit. The measurement circuit 110 can include analog to digital converters (ADCs) 208a, 208b. For example, the output of current sensor 202 can be converted into a suitable digital signal by ADC 208a that can be processed by the DSP 206b. Similarly, the output of voltage sensor 204 can be converted to a digital signal by ADC 208b.

Figure 3:
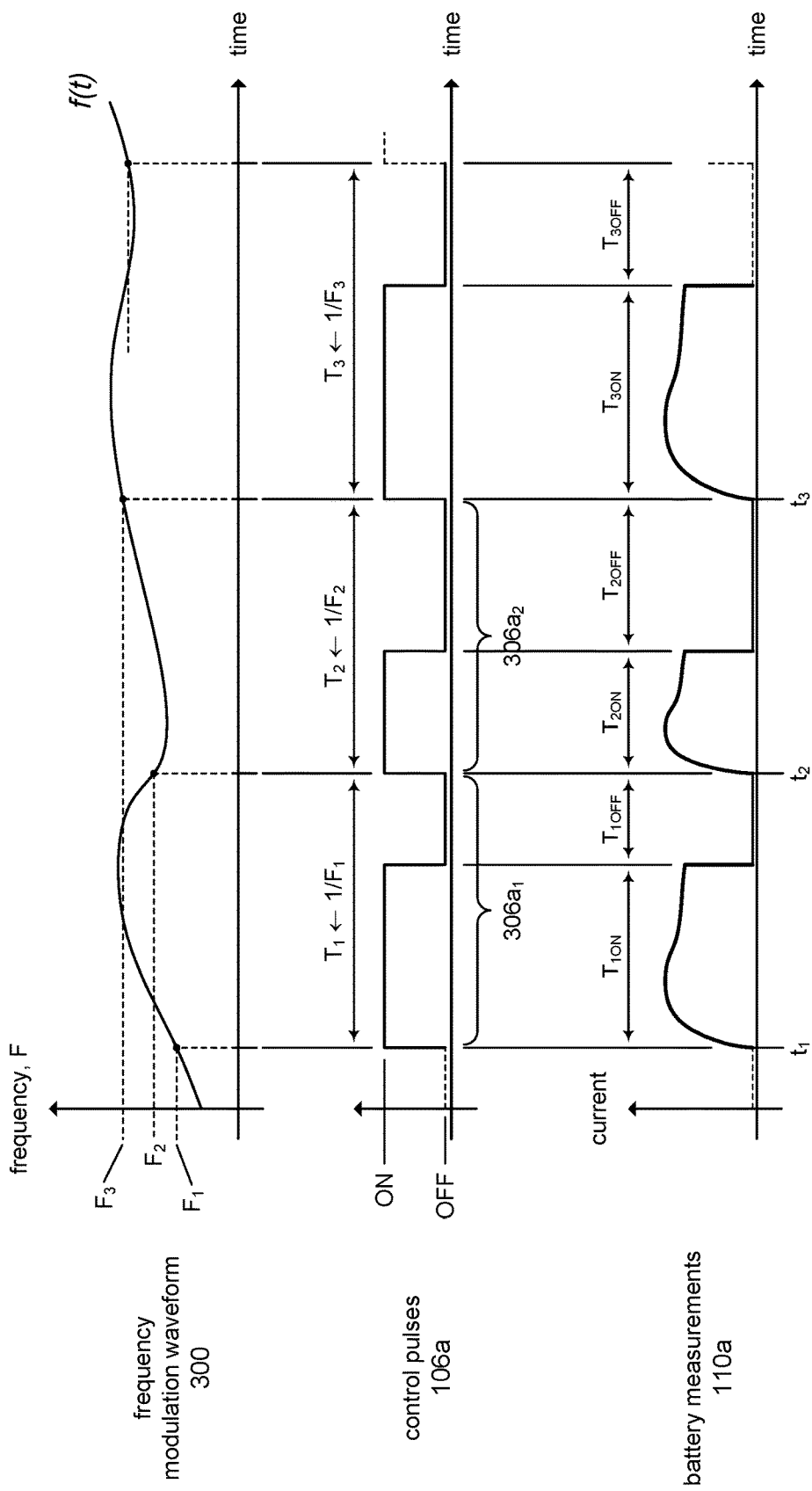
FIG. 3 shows waveforms for pulse charging in accordance with the present disclosure.

Referring now to FIG. 3, modulated pulse charging in accordance with the present disclosure will be explained in terms of the waveforms depicted in the figure. FIG. 3 shows a frequency modulation waveform 300 that is used to specify pulse periods that can be identified, or otherwise associated, with control pulses 106a (and hence the charging pulse 102a). In some embodiments, the frequency modulation waveform 300 can be expressed as change in frequency vs. time, as shown in the figure. In other embodiments, the frequency modulation waveform 300 can be expressed as change in pulse period vs. time. Thus, with respect to the frequency vs. time waveform in FIG. 3, for a given frequency f taken at time t, the pulse period can be computed by its reciprocal, namely 1/f.

In accordance with the present disclosure, the frequency modulation waveform 300 can be used to select a pulse period (vis-à-vis its frequency) for each of the control pulses 106a based on the timing of the control pulse. Thus, for example, a control pulse $306a_1$ that begins at time $t_1$ will be associated with a pulse period ($T_1$) based on a frequency ($F_1$) on the frequency modulation waveform 300 at time $t_1$. Likewise, a control pulse $306a2$ at time $t_2$ will be associated with a pulse period ($T_2$) based on a frequency ($F_2$) taken off the frequency modulation waveform 300 at time $t_2$, and so on. Furthermore, in accordance with the present disclosure, each control pulse (e.g., $306a_1$) is "associated" with its respective pulse period ($T_1$) in the sense that the actual pulse period can be different from its associated pulse period. This aspect of the present disclosure is discussed below.

FIG. 3 also shows diagrammatic examples of battery measurements 110a taken by the measurement circuit 110. In some embodiments, the battery measurements 110a can be expressed in terms of current flow through the battery 12 as a function of time. As the figure shows, the battery measurements 110a exhibit a response profile during the ON periods ($T_{1ON}$, $T_{2ON}$, etc.) of the control pulses 106a when current is being supplied to the battery 12 by the charging pulses 102a (FIG. 1). In accordance with the present disclosure, the duty cycle of each control pulse 106a can be determined based on the battery measurements 110a. The duty cycle of a pulse is typically computed as the ratio of the ON period of the pulse to the total period of the pulse; e.g., the duty cycle of pulse $306a_1$ can be computed as the ratio $T_{1ON}/(T_{1ON}+T_{1OFF})$.

The waveform shown in FIG. 3 shows that the frequency modulation waveform 300 can be any arbitrary waveform. As FIG. 3 indicates, in some embodiments, the frequency modulation waveform 300 can be a continuous function and computed on the fly. In other embodiments, the frequency modulation waveform 300 can comprise data points in a lookup table 108.

Figure 4A:
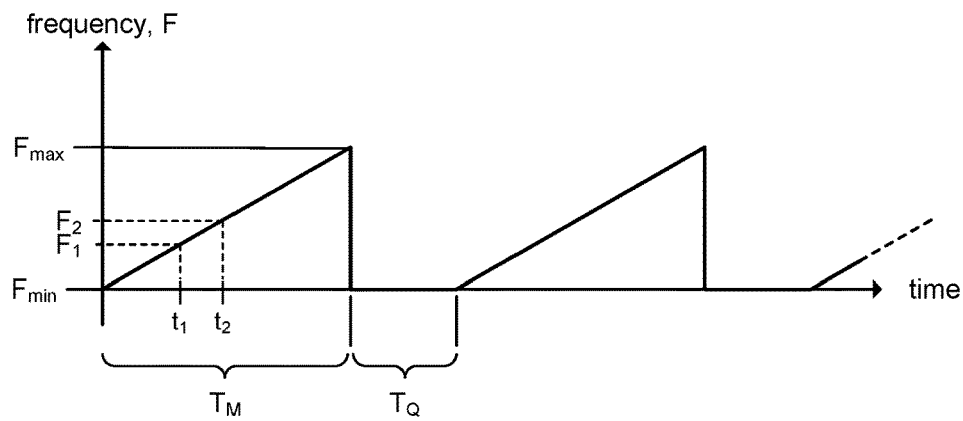
FIGS. 4A, 4B, and 4C illustrate examples of frequency modulation waveforms.
Figure 4B:
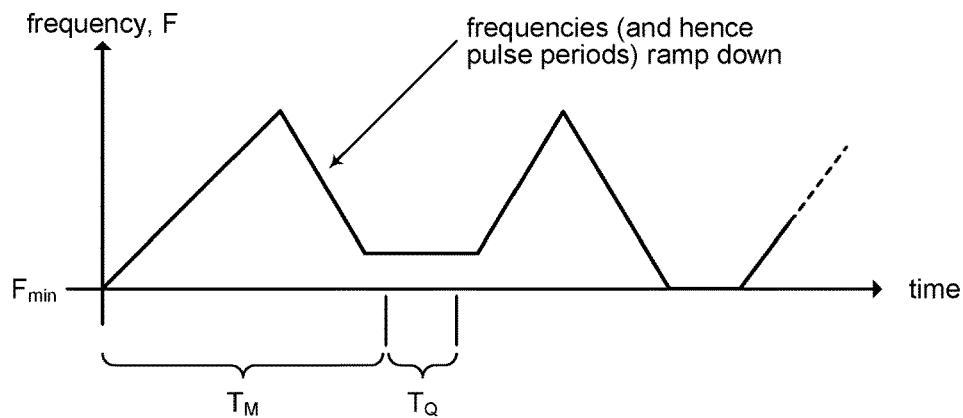
Figure 4C:
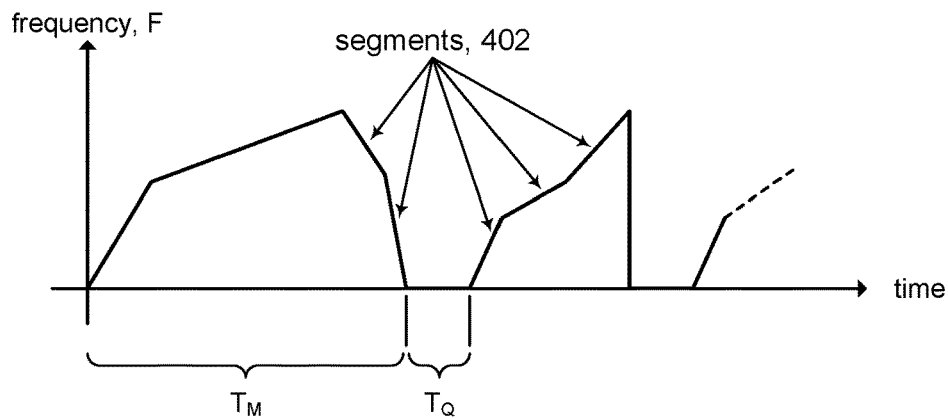

Refer now to FIGS. 4A, 4B, 4C for additional examples of frequency modulation waveforms, in accordance with various embodiments of the present disclosure, used to generate pulse periods for the control pulses 106a. FIG. 4A shows an example of a sawtooth type modulation waveform. The modulation waveform can comprise alternating modulation periods $T_M$ and quiescent periods $T_Q$. In various embodiments, the modulation period $T_M$ can be on the order of several seconds to tens of seconds. In various embodiments, the quiescent period $T_Q$ can be on the order of one to several seconds.

During a modulation period $T_M$, the selected frequency (and hence pulse period) can vary with time; the example shown in FIG. 4A, for example, shows that the pulse period can vary from $1/F_{max}$ to $1/F_{min}$.

In some embodiments, the variation in pulse periods can be linear as shown in the figure, and in other embodiments, the variation in pulse periods can be other than linear. During a quiescent period $T_Q$, the pulse periods can remain constant, or in some embodiments the controller 106 can terminate pulse charging during a quiescent period $T_Q$. The modulation periods $T_M$ can vary in duration, and likewise the quiescent periods $T_Q$ can vary in duration.

FIG. 4B shows that the pulse period can be other than a $1/F_{min}$ in a given quiescent period $T_Q$. The figure further illustrates that the modulation waveform can include portions that ramp down the pulse period as well as ramping up the pulse period.

FIG. 4C shows that a modulation waveform can comprise several segments 402.

Figure 5:
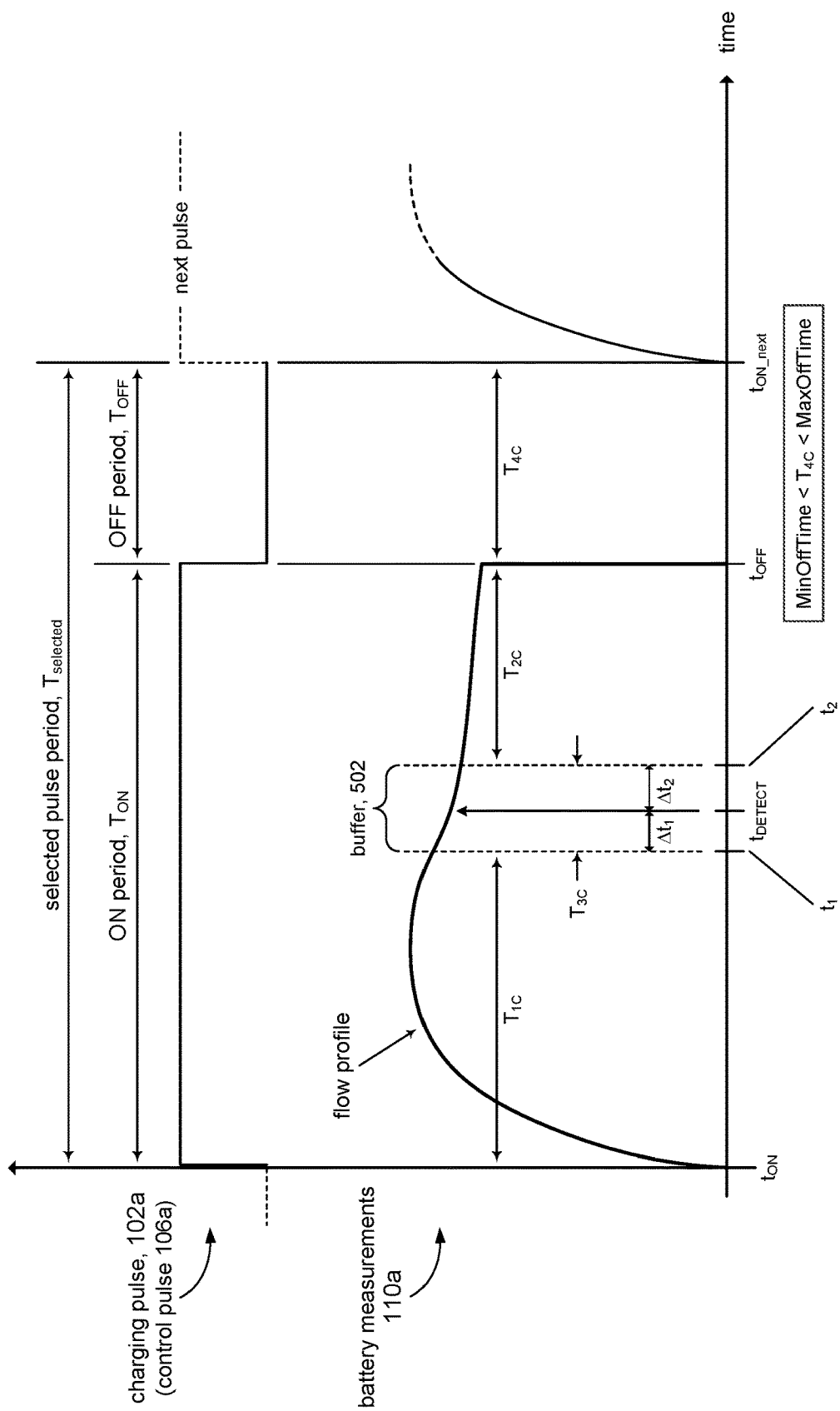
FIG. 5 illustrates details for determining the duty cycle of a charging pulse in accordance with the present disclosure.

Referring now to FIG. 5, the controller 106, in accordance with the present disclosure, can use the battery measurements 110a taken during the time of a charging pulse 102a to determine its duty cycle. Assume for discussion purposes the selected pulse period for charging pulse 102a is $T_{selected}$; e.g., selected from a modulated waveform such as shown FIGS. 4A-4C at a time $t_{ON}$. The charging pulse 102a has an ON period ($T_{ON}$) and an OFF period ($T_{OFF}$). The duration of $T_{ON}$ and $T_{OFF}$ can be dynamically determined based on battery measurements 110a made during the ON period of the charging pulse 102a.

The battery measurements 110a can comprise measurements of current flow through the battery 12. Current flow through the battery 12 can gradually increase from the time $t_{ON}$ that the charging pulse 102a is applied and follow the flow profile such as shown in FIG. 5. The flow profile of current through the battery 12 depends factors such as battery chemistry, state of charge, temperature, and the like. In a lithium ion battery, for example, the lithium ions flow from the positive electrode to the negative electrode through the electrolyte. The electrons and lithium ions combine at the negative electrode and deposit there. During a charging pulse, the charge current saturation can occur where additional charge current into the battery 12 for that charging pulse 102a may not be effective and may even be detrimental (e.g., cause heat build up, create mechanical stress).

In accordance with the present disclosure, the controller 106 can analyze or otherwise track the current flow to detect the onset charge current saturation by looking for a change in the flow profile. Suppose at time $t_{DETECT}$ the controller 106 detects such a change in the flow profile. The time of detection $t_{DETECT}$ can be used to determine the duration $T_{ON}$ of the ON period of the charging pulse 102a, for example, in order to limit the charge current into the battery 12. A first time period $T_{1C}$ between $t_{ON}$ and $t_{DETECT}$ can be computed by backing off a margin of time $\Delta t_1$ from $t_{DETECT}$, for example, by computing $t1=t_{DETECT}-\Delta t_1$. A buffer 502 comprising the margin of time $\Delta t_1$ and $\Delta t_2$ can be provide around the detection time $t_{DETECT}$ to account for uncertainty in the detection of the onset of charge saturation. The first period $T_{1C}$ can be the period between time $t_{ON}$ and time $t_1$.

A second time period $T_{2C}$ can be computed based on keeping the second time period within a predetermined range. During the second time period $T_{2C}$, charge saturation can be a dominant factor during the charging pulse. In some embodiments, the second time period $T_{2C}$ can be determined in order to maintain a certain ratio R between $T_{1C}$ and $T_{2C}$. For example, $T_{2C}$ can be computed from the relation: $R=T_{1C}/T_{2C}$, where R can be a predetermined ratio. The ON period $T_{ON}$ can be computed as $T_{ON}=(T_{1C}+T_{2C}+T_{3C})$, where $T_{3C}$ is the width of the buffer 502. By dynamically computing the ON period for each charging pulse 102a, battery charging can be more efficient, battery damage that inherently arises during charging (e.g., heat build up) can be reduced (which can contribute to safety), and battery life can be extended.

In accordance with the present disclosure, the OFF period $T_{OFF}$ of the charging pulse 102a can be computed by subtracting the $T_{ON}$ from the selected pulse period $T_{selected}$. However, if the resulting OFF period is too long, then overall battery charging time can be increased, which is typically undesirable. Accordingly, in accordance with the present disclosure if the $T_{OFF}$ exceeds a predetermined maximum time MaxOffTime, $T_{OFF}$ can be set to MaxOffTime. As a consequence, the actual pulse period of the charging pulse 102a will be different from the selected pulse period $T_{selected}$.

If, on the other hand, the resulting OFF period is too short, then there may not be enough recovery time for various chemical reactions in the battery 12 to run their course before the onset of the next charging pulse; more time may be needed. Accordingly, in accordance with the present disclosure, if the $T_{OFF}$ becomes less than a predetermined minimum time MinOffTime, $T_{OFF}$ can be set to MinOffTime to allow time for the chemical reactions to take place before initiating the next charging pulse. As a consequence, the actual pulse period of the charging pulse 102a will be different from the selected pulse period $T_{selected}$.

The amplitude of the charging current I (FIG. 1) of the charging pulse can vary from one charging pulse to the next, during the charging process. The inventors of the present disclosure have noted that the OFF period of one charging pulse can affect the charging current amplitude. Accordingly, in some embodiments, rather than basing the OFF period on the selected pulse period $T_{selected}$, the OFF period can be varied between MinOffTime and MaxOffTime in response to the amplitude of the charging current I.

In some embodiments, the output voltage of the charger 102 can be selected for different charging pulses 102a. A reason for doing this is to limit the "headroom" for the current of the charging pulse 102a. The battery impedance can be a highly dynamic parameter whose value can change very quickly. It can be impractical, and in some cases may not be feasible, to use a conventional feedback loop to control the charging current to accommodate for a changing battery impedance. In accordance with some aspects of the present disclosure, the output voltage of the charger 102 can be adjusted to limit its output level so that the current flow (i.e., charging current I, FIG. 1) into the battery 12 does not exceed safety levels. For example, suppose the safety limit sets a peak charging current of the battery 12 to be 35 A. If we expect the battery 12 to have a minimum battery impedance of 100 mΩ and an open circuit voltage (OCV) of 3.5 V, this establishes a 7V output voltage for the charger 102:

$$3.5V+35 A\times 0.1\Omega=7V.$$

In other embodiments, instead of limiting the output voltage of the charger 102, the switch 104 can be used to limit the flow of charging current I into battery 12. Referring to FIG. 1, for example, the controller 106 can produce an analog output to adjust the gate-source voltage of switch 104 and hence the device channel saturation of the switch 104, to control the charging current I.

The battery impedance can change dynamically from one charging pulse to another. For a given charging pulse, the battery impedance can be at some initial value at the beginning of the charging pulse and at some higher value at the end of the charging pulse. The impedance change during the pulse period can be non-linear in time. The lowest and highest values of the battery impedance during a given charging pulse can vary during the charging process. These impedance changes can be predicted based on impedance values previously recorded during other charges of the battery or based on a mathematical model of the battery.

Figure 6:
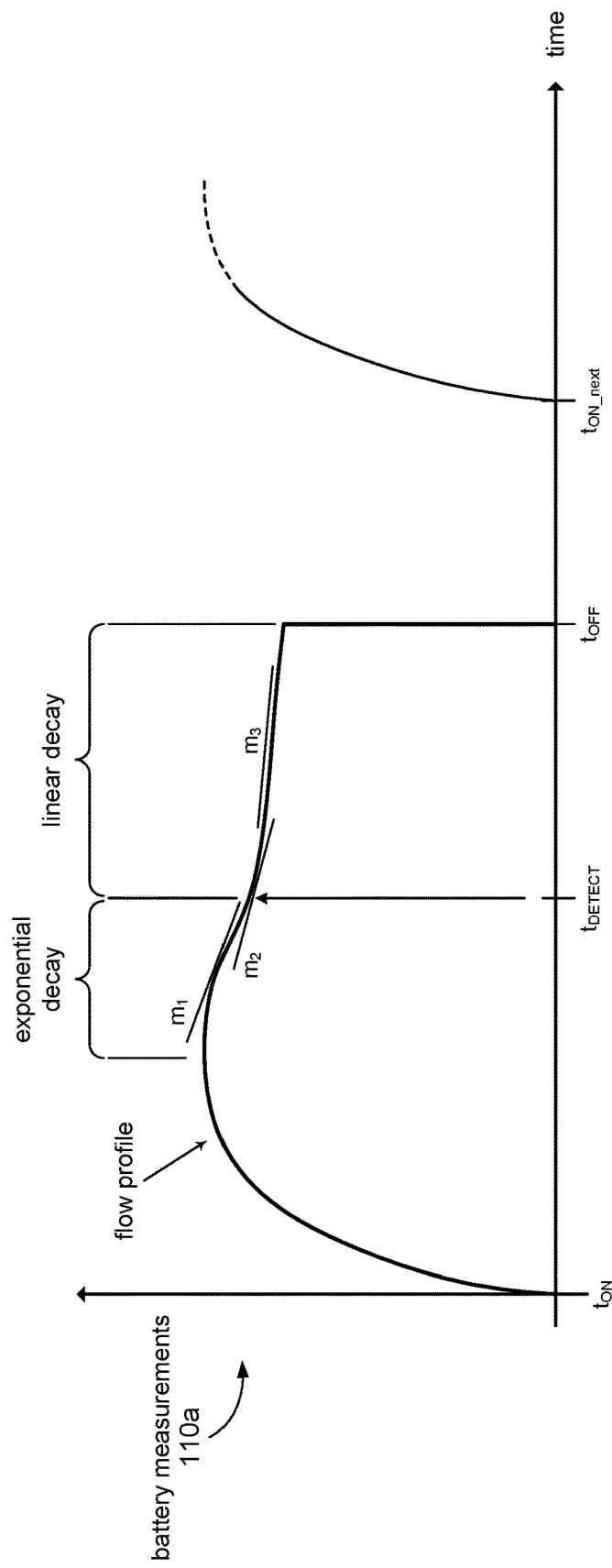
FIG. 6 illustrate details for detecting a change in the current flow through a battery in accordance with the present disclosure.

FIG. 6 illustrates an example of detecting a change in the current flow through the battery that can be indicative of the onset of charge current saturation. In some embodiments, for example, the flow profile may include a exponential decay portion and a linear decay portion. The slope of the flow profile can be monitored to detect the transition between the exponential decay portion and the linear decay portion. For example, the slope can be monitored at the onset of the charging pulse at time $t_{ON}$. In some embodiments, the monitoring can begin at some time after $t_{ON}$, since saturation does not happen right away. In some embodiments, the rate of change of the slope (i.e., second derivative of the flow profile) can be used to determine when the change in the current flow through the battery has occurred. In other embodiments, we can monitor for the rate of change of the rate of change (i.e., a third derivative) of the charging current. In particular, we can detect for a change in the sign of the third derivative.

It will be appreciated that other detection techniques can be used. In some embodiments, for example, the change can be associated with switching from exponential current decline into linear current decline. In other embodiments, detection can be based on switching from one exponential decline into another much slower exponential decline, and so on.

Figure 7:
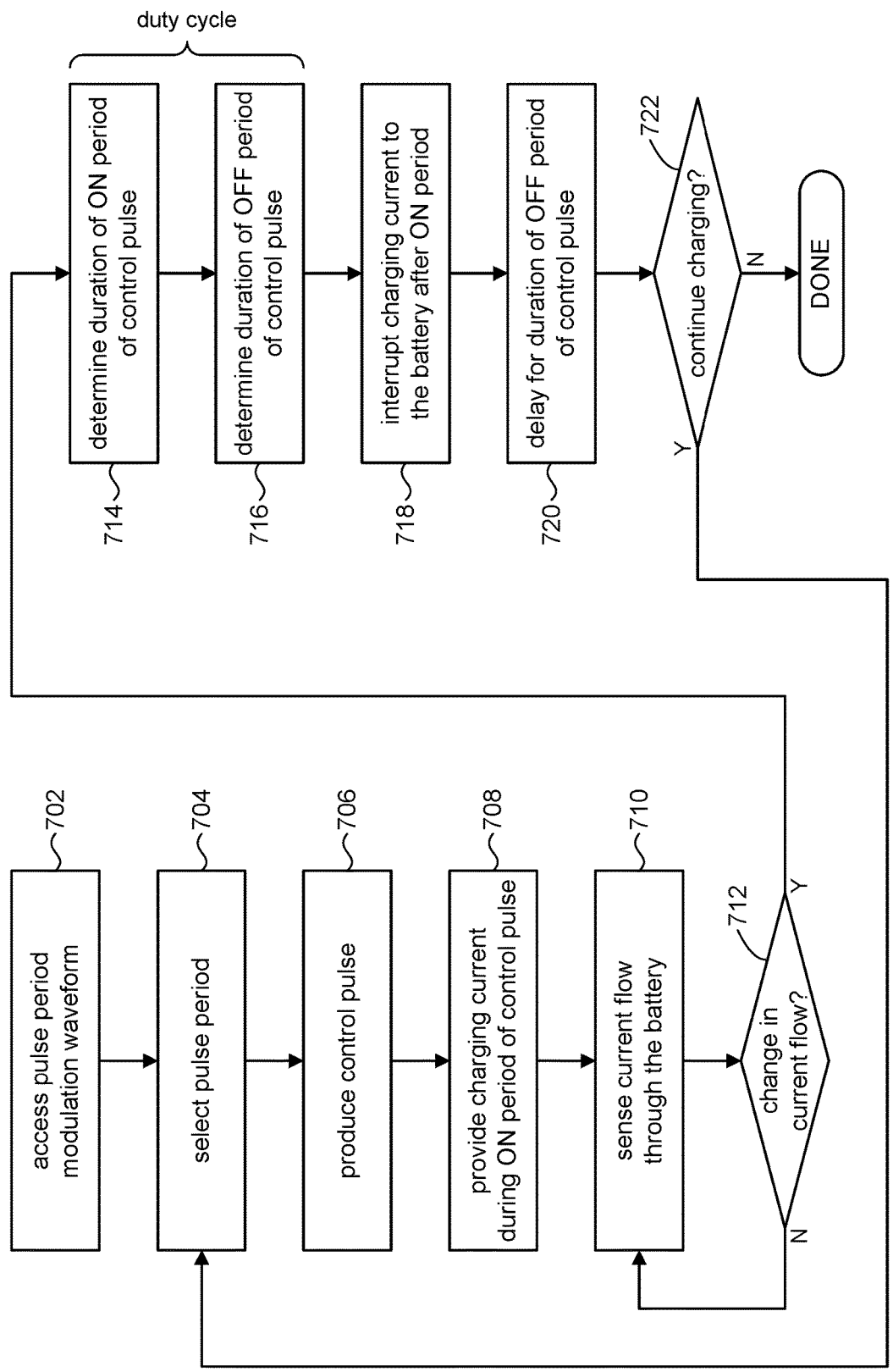
FIG. 7 shows processing in the controller for frequency modulated charging in accordance with the present disclosure.

Referring to FIG. 7, the discussion will now turn to a high level description of processing in the controller 106 for generating charging pulses 102a using pulse modulation in accordance with the present disclosure. In some embodiments, for example, the controller 106 may include computer executable program code or equivalent firmware (e.g., field programmable gate array, FPGA), which when executed cause the controller 106 to perform the processing in accordance with FIG. 7. The flow of operations performed by the controller 106 is not necessarily limited to the order of operations shown.

At block 702, the controller 106 can access a pulse period modulation waveform (e.g., 300, FIG. 3). In some embodiments, the modulation waveform can comprise a set of pre-computed data points stored in a lookup table (e.g., 108, FIG. 1). In other embodiments, the controller 106 can compute the pulse periods on the fly.

At block 704, the controller 106 can select a pulse period as a function of time using the modulation waveform. The controller 106 can include a counter to provide a time base.

At block 706, the controller 106 can output a control pulse 106a to turn ON the switch 104, thus providing charging current to the battery 12 (block 708).

At block 710, the controller 106 can sense current flow through the battery 12. In some embodiments, for example, the measurement circuit 110 can provide battery measurements 110a to the controller 106. The controller 106 can analyze the battery measurements 110a to detect a change in current flow through the battery 12, for example, that indicates the onset of charge current saturation in the battery 12.

At block 712, the controller 106 continue to sense current flow through the battery 12 if a change in the flow profile has not been detected. Otherwise, processing can continue to block 714.

At block 714, the controller 106 can determine the duration of the ON period $T_{ON}$ of the charging pulse as explained above, using the selected pulse period (block 704), thus establishing a duty cycle of the charging pulse.

At block 716, the controller 106 can determine the OFF period $T_{OFF}$ of the charging pulse. If the ON period for the charging pulse is too short, that can result in too long of an OFF period; in which case, the $T_{OFF}$ can be set to MaxOffTime. Conversely, if the ON period for the charging pulse is too long, that can result in too short of an OFF period; in which case, the $T_{OFF}$ can be set to MinOffTime. Otherwise, $T_{OFF}$ can be set so that the actual pulse period of the charging pulse is equal to the selected pulse period. Alternatively, $T_{OFF}$ can be set to any value between MinOffTime and MaxOffTime in response to the amplitude of the charging current, as discussed above.

At block 718, the controller 106 can turn OFF the switch 104 at the end of the ON period determined at block 714 to interrupt the flow of charging current from the charger 102 to the battery 12.

At block 720, the controller 106 can delay for a period of time equal to $T_{OFF}$ before initiating the next charging pulse. During this delay period, the interruption of charging current from the charger 102 to the battery 12 can be a complete interruption if the switch 104 is fully OFF (i.e., no flow of charging current to the battery). In some embodiments, during this delay period, some flow of current from the charger 102 can be provided to the battery 12, for example, by partially turning OFF the switch 104 or controlling the charger 102 to provide a small amount of trickle current to the battery 12. In other embodiments, the charger 102 can be controlled to create a reverse flow of current from the battery 12; e.g., a discharge current.

At block 722, the controller 106 can determine whether to continue charging the battery 12 before initiating the next charging pulse. In some embodiments, for example, a battery management system (BMS, not shown) can make that determination and signal the controller 106 whether to continue charging or not. If charging continues, then processing can return to block 704 to select the next pulse period.

Figure 8:
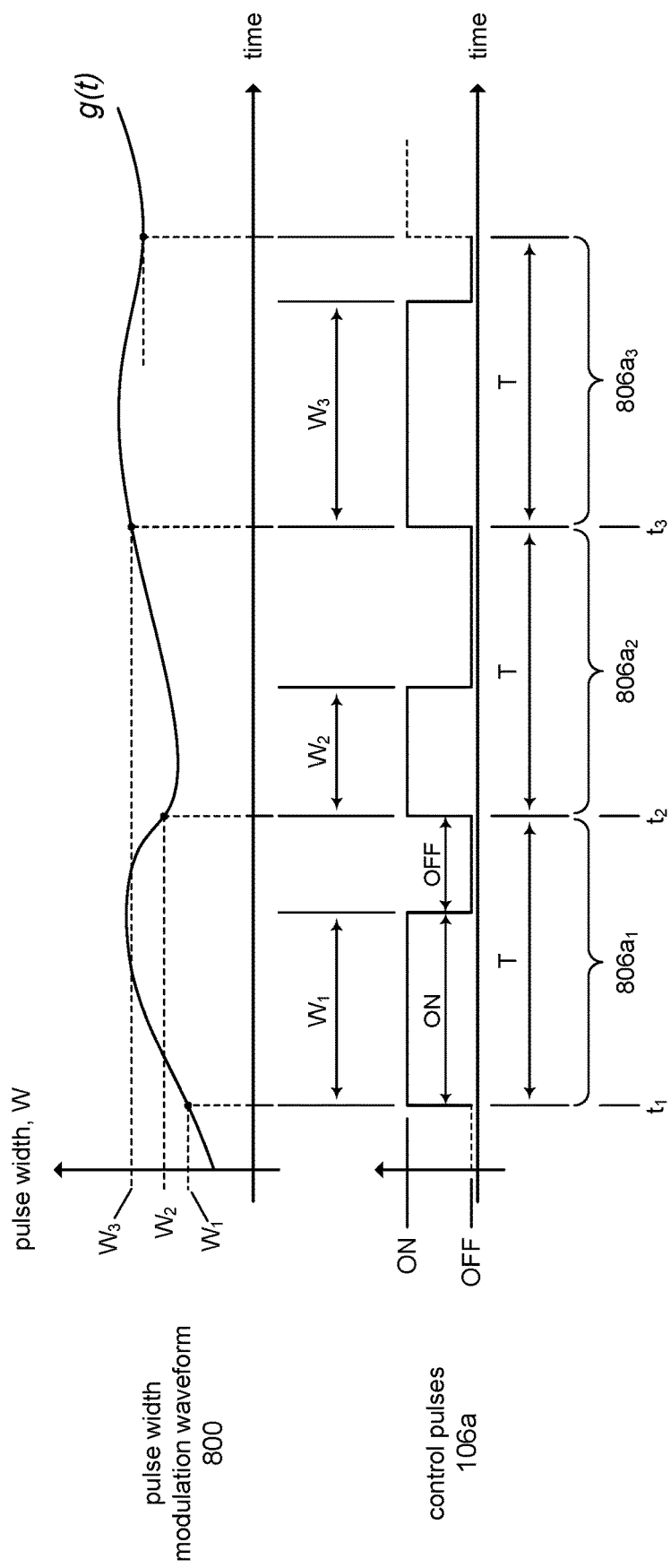
FIGS. 8 and 9 illustrate pulse width modulation in accordance with the present disclosure.

In accordance with some embodiments of the present disclosure, the pulse widths of the charging pulses 102a can be modulated. Referring to FIG. 8, in some embodiments, a pulse width modulation waveform 800 can be used to specify pulse widths for the control pulses 106a (and hence the charging pulse 102a) as a function of time. In some embodiments, the pulse width modulation waveform 800 can be expressed as change in pulse width vs. time, as shown in the figure.

In accordance with the present disclosure, the pulse width modulation waveform 800 can be used to select a pulse width (e.g., $W_1$, $W_2$, $W_3$) for the control pulses 106a (and hence the charging pulse) based on the timing of the control pulse. Thus, for example, a control pulse $806a_1$ that begins at time $t_1$ will be associated with a pulse width ($W_1$) selected from the modulation waveform 800 at time $t_1$. Likewise, a control pulse $806a_2$ at time $t_2$ will be associated with a pulse width ($W_2$) taken off the modulation waveform 800 at time $t_2$, and so on.

The selected pulse width for each control pulse (e.g., $806a_1$) can serve as the ON duration for the control pulse. The OFF duration of the control pulse can be computed as the difference between the pulse period T of the control pulse and the ON duration. In some embodiments, such as shown in FIG. 8, the pulse period T can be the same from one charging pulse to another. Consequently, the OFF duration for a given charging pulse can vary depending on the ON duration (selected according to the pulse width modulation waveform 800) for the given charging pulse.

The pulse width modulation waveform 800 can be any arbitrary waveform, such as depicted in FIG. 8. However, in various embodiments, the pulse width modulation waveform 800 can have a more regular pattern, such as the frequency modulation waveforms shown in FIGS. 4A-4C.

Figure 9:
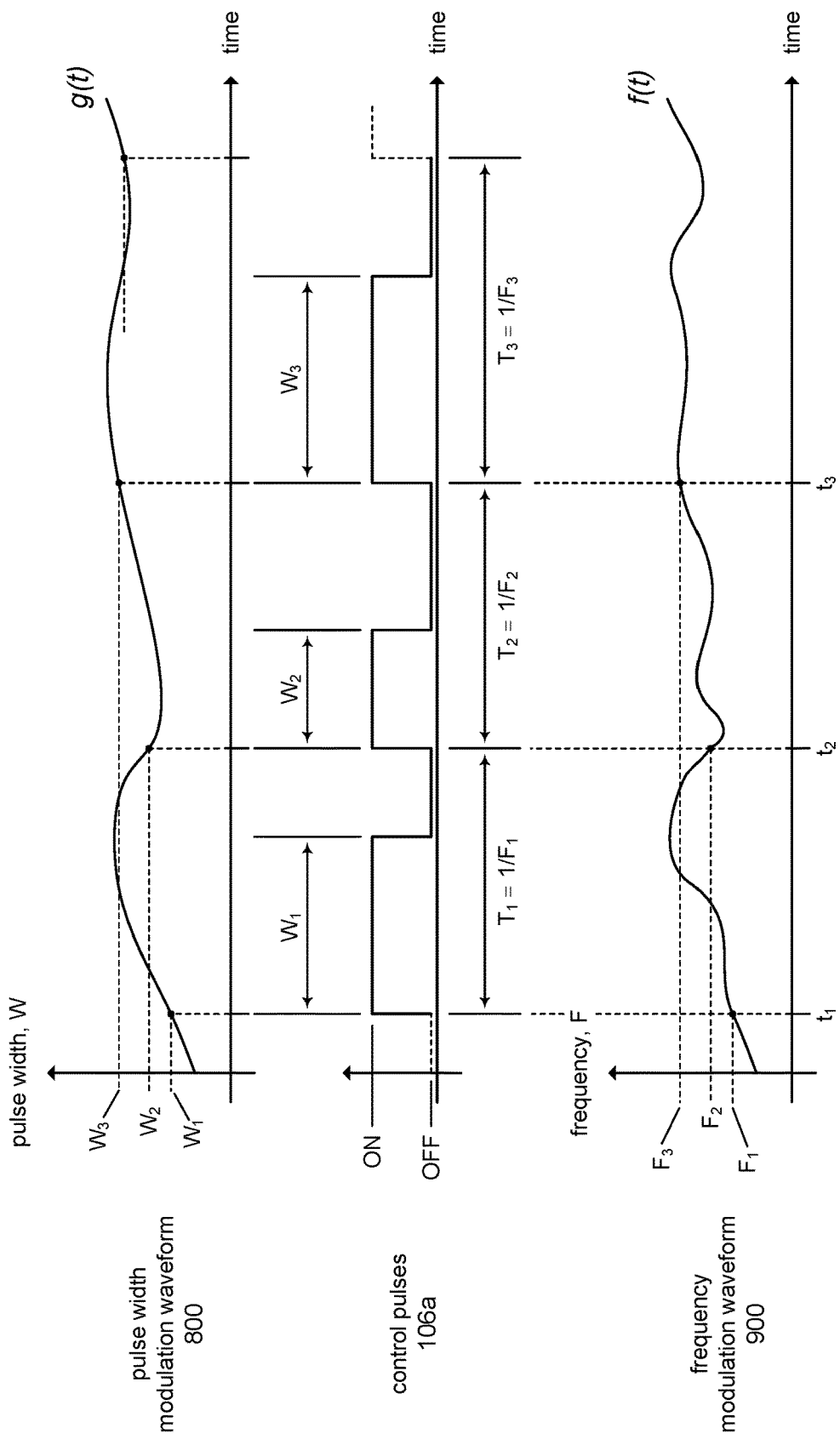

FIG. 9 illustrates that in some embodiments, the pulse period can also vary from one charging pulse to another. Thus, for example, a frequency modulation waveform 900 can be used to select the pulse period for each charging pulse. In some embodiments, the pulse width modulation waveform 800 can be the same as the frequency modulation waveform 900. In other embodiments, the pulse width modulation waveform 800 can be a different waveform from the frequency modulation waveform 900.

Figure 10:
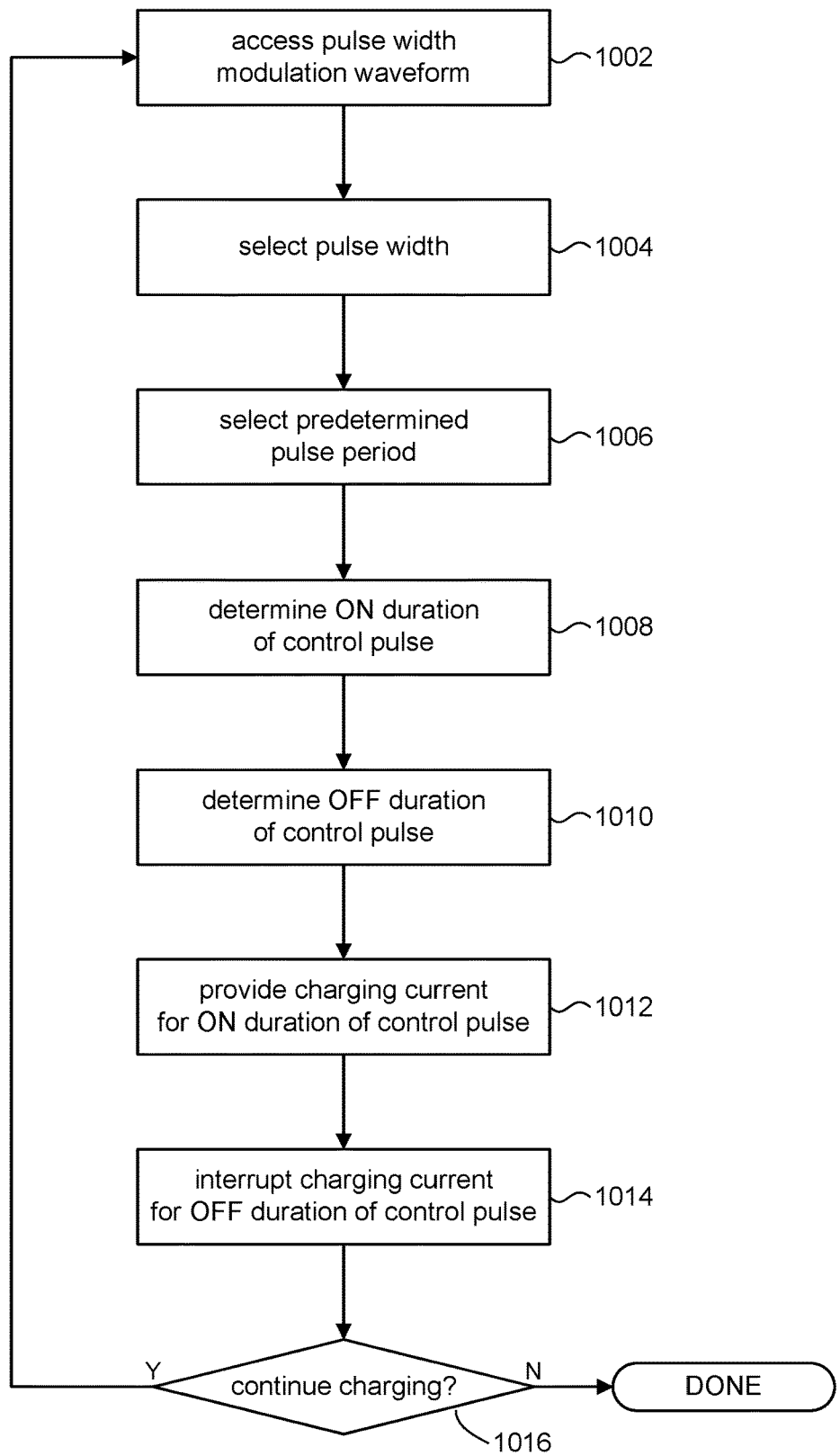
FIG. 10 shows processing in the controller for pulse width modulated charging in accordance with the present disclosure.

Referring to FIG. 10, the discussion will now turn to a high level description of processing in the controller 106 for generating charging pulses 102*a* using pulse width modulation in accordance with the present disclosure. In some embodiments, for example, the controller 106 may include computer executable program code or equivalent firmware (e.g., field programmable gate array, FPGA), which when executed cause the controller 106 to perform the processing in accordance with FIG. 10. The flow of operations performed by the controller 106 is not necessarily limited to the order of operations shown.

At block 1002, the controller 106 can access a pulse width modulation waveform (e.g., 800, FIG. 8). In some embodiments, the pulse width modulation waveform can comprise a set of pre-computed data points stored in a lookup table (e.g., 108, FIG. 1). In other embodiments, the controller 106 can compute the pulse widths on the fly.

At block 1004, the controller 106 can select a pulse width as a function of time using the modulation waveform.

At block 1006, the controller 106 can select a predetermined pulse period. In some embodiments, the predetermined pulse period can be the same value for each charging pulse. In other embodiments, a frequency modulation waveform (e.g., 900, FIG. 9) can be used to select a pulse period as the predetermined pulse period.

At block 1008, the controller 106 can compute or otherwise determine an ON duration of the control pulse. In some embodiments, for example, the controller 106 can use the selected pulse width (block 1004) for the ON duration.

At block 1010, the controller 106 can compute or otherwise determine an OFF duration of the control pulse. In some embodiments, for example, the controller 106 the OFF duration can be the difference between the predetermined pulse period (block 1006) and the ON duration (block 1008).

At block 1012, the controller 106 can provide a charging current to the battery 12 (i.e., the charging pulse 102*a*) for a period of time substantially equal to the ON duration.

At block 1014, the controller 106 can interrupt the charging current to the battery 12 for a period of time substantially equal to the OFF duration before applying the next charging pulse. The ON duration and the OFF duration define the period of the charging pulse. As explained above for block 720, the charging current can to the battery 12 can be completely interrupted (i.e., no charging current flow to the battery), or in some embodiments, a small (e.g., trickle) current flow can be provided to the battery. In other embodiments, a reverse flow of current from the battery 12 can be created (e.g., a discharge current).

At block 1016, the controller 106 can controller 106 determine whether to continue charging the battery 12 before initiating the next charging pulse. In some embodiments, for example, a battery management system (BMS, not shown) can make that determination and signal the controller 106 whether to continue charging or not. If charging continues, then processing can return to block 1002 to select the next pulse width.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method to charge a battery, the method comprising:
   selecting a pulse period;
   (i) providing a charging pulse to the battery, including:
      providing a charging current from a power source to the battery at a beginning of an ON period of the charging pulse;
      determining a current flow through the battery;
      detecting a change in current flow through the battery; and
      determining a duration of the ON period of the charging pulse based on when the change in current flow through the battery was detected relative to application of the charging current to the battery; and
      interrupting the charging current from the power source to the battery at an end of the ON period of the charging pulse;
   (ii) determining a duration of an OFF period of the charging pulse, including computing a difference between the selected pulse period and the ON period of the charging pulse;
   (iii) delaying for a duration of the OFF period of the charging pulse;
   (iv) selecting another pulse period; and
   repeating (i), (ii), (iii), and (iv) using the pulse period selected in (iv).

2. The method of claim 1,
   wherein determining the duration of the OFF period of the charging pulse further includes selecting the greater of: (1) a minimum period of time, and (2) the difference between the selected pulse period and the ON period of the charging pulse.

3. The method of claim 1,
   wherein determining the duration of the OFF period of the charging pulse further includes selecting the lesser of: (1) a maximum period of time, and (2) the difference between the selected pulse period and the ON period of the charging pulse.

4. The method of claim 1,
   wherein determining the duration of the ON period of the charging pulse includes:
   computing a first time period between the application of the charging current to the battery and the detection of the change in current flow through the battery; and
   computing a second time period based on a particular ratio between the first time period and the second time period.

5. The method of claim 4, wherein determining the duration of the ON period of the charging pulse includes determining a sum of the first time period, the second time period, and a duration of a buffer period that spans a detection time of the change in current flow through the battery.

6. The method of claim 1,
   wherein delaying for the duration of the OFF period of the charging pulse includes one of:
   providing some flow of current from the power source to the battery; or
   creating a flow of current out of the battery.

7. The method of claim 1,
further comprising changing an output voltage of the power source to limit the maximum charging current from one charging pulse to another charging pulse.

8. The method of claim 1,
wherein the pulse periods are selected according to a waveform that represents the pulse periods as function of time.

9. An apparatus to charge a battery, the apparatus comprising:
a controller; and
a computer-readable storage medium comprising instructions to control the controller to:
select a pulse period;
(i) provide a charging pulse to the battery, including:
  providing a charging current from a power source to the battery at a beginning of an ON period of the charging pulse;
  receiving battery measurements;
  detecting a change in current flow through the battery using the battery measurements; and
  determining a duration of the ON period of the charging pulse based on when the change in current flow through the battery was detected relative to application of the charging current to the battery; and
  interrupting the charging current from the power source to the battery at an end of the ON period of the charging pulse;
(ii) determine a duration of an OFF period of the charging pulse, including computing a difference between the selected pulse period and the ON period of the charging pulse;
(iii) delay for a duration of the OFF period of the charging pulse;
(iv) select another pulse period; and
repeat (i), (ii), (iii), and (iv) using the pulse period selected in (iv).

10. The apparatus of claim 9, wherein determining the duration of the OFF period of the charging pulse further includes selecting the greater of: (1) a minimum period of time, and (2) the difference between the selected pulse period and the ON period of the charging pulse.

11. The apparatus of claim 9, wherein determining the duration of the OFF period of the charging pulse further includes selecting the lesser of: (1) a maximum period of time, and (2) the difference between the selected pulse period and the ON period of the charging pulse.

12. The apparatus of claim 9, wherein determining the duration of the ON period of the charging pulse includes:
computing a first time period between the application of the charging current to the battery and the detection of the change in current flow through the battery; and
computing a second time period based on a particular ratio between the first time period and the second time period.

13. The apparatus of claim 12, wherein the duration of the ON period of the charging pulse comprises a sum of the first time period, the second time period, and a duration of a buffer period that spans a detection time of the change in current flow through the battery.

14. The apparatus of claim 9, further comprising an FET device to serve as a switch to provide the charging current from the power source to the battery, and to interrupt the charging current from the power source to the battery,
wherein the computer-readable storage medium further comprises instructions to control the controller to vary a gate-source voltage of the FET device to control a flow of charging current to the battery.

15. The apparatus of claim 9, further comprising a lookup table having stored thereon modulation waveform data representative of pulse periods for selection.

* * * * *